United States Patent [19]

Uchida

[11] Patent Number: 5,185,567
[45] Date of Patent: Feb. 9, 1993

[54] POWER CIRCUIT FOR AN LSI

[75] Inventor: Yukimasa Uchida, Yokohama, Japan

[73] Assignee: Kabushiki Kaisha Toshiba, Kanagawa, Japan

[21] Appl. No.: 726,810

[22] Filed: Jul. 8, 1991

[30] Foreign Application Priority Data

Jul. 10, 1990 [JP] Japan .................................. 2-180521

[51] Int. Cl.$^5$ ...................... H02M 3/335; G05F 1/46
[52] U.S. Cl. .................... 323/267; 363/65; 363/63; 323/272; 307/19
[58] Field of Search ........................ 323/267, 271, 272; 363/63, 65; 307/18, 19, 29, 51, 85, 86, 87

[56] References Cited

U.S. PATENT DOCUMENTS

| 3,946,375 | 3/1976 | Bishop et al. | 307/51 |
| 4,186,437 | 1/1980 | Cuk | 363/65 |
| 4,651,269 | 3/1987 | Matsumura | 363/63 |
| 4,740,878 | 4/1988 | Carter et al. | 363/63 |
| 4,835,652 | 5/1989 | Billings et al. | 363/63 |

OTHER PUBLICATIONS

Noguchi, T. et al., "Prediction of the Electromigration Life Span of All LSI Wirings", Nikkei Microdevices, pp. 101-107, (Sep. 1989).

Primary Examiner—Steven L. Stephan
Assistant Examiner—Ben M. Davidson
Attorney, Agent, or Firm—Finnegan, Henderson, Farabow, Garrett and Dunner

[57] ABSTRACT

Each end of a power wiring is connected to a first or a second power supply circuit, respectively. These two power supply circuits are activated alternately allowing for some time-overlap. As a result, current flowing in the wiring changes its flowing direction alternately to prevent the degradation of the wiring due to the electro-migration phenomena.

10 Claims, 4 Drawing Sheets

POWER CIRCUIT FOR AN LSI

BACKGROUND OF THE INVENTION

1. Field of the Invention

This invention relates to a power circuit for an LSI (large scale integrated circuit). More particularly, it relates to a power circuit for an LSI which is able to prevent the degradation of power wirings caused by the electro-migration phenomena.

2. Description of the Prior Art

As fine processing techniques of LSIs have progressed recently, a strong need has arisen to make wirings narrower in LSIs. With this fine processing, there is a great need to make wiring layers thinner. On the other hand, the amount of consumed power per one LSI chip has increased as a result of the high integration and the enlargement of one LSI chip. According to the above-mentioned facts, the current density per cross sectional unit has increased more and more.

It is also well known that fine power wirings will be degraded and, finally, disconnected because of the electro-migration phenomena, if current above the tolerance continues to be applied to the wirings. The electro-migration phenomena is caused by the movement of metal atoms, which migrate toward the same direction of the electron flow in fine wirings. When an electric current flows in a power wiring, electrons, which flow in the reverse direction to the current flow, collide in the wiring against metal atoms, of which the wiring is made, and impart their kinetic energy to the metal atoms. As a result, the metal atoms move with electrons to cause the electro-migration phenomena. This electro-migration phenomenon is also accelarated by Joule heat generated by the current flow in the wiring. See, for example, "Prediction of the electro-migration life time of all LSI wirings", Noguti, et. al., Nikkei Micro Device, Sep. 1989, for the electro-migration phenomena.

FIG. 1 shows a typical power circuit for an LSI as an example of prior art of this invention. As shown, a plurality of circuits 3 ($C_1, C_2, \ldots C_n$), of which an LSI is composed, are connected between a power wiring 1 and a ground power wiring 2 of the LSI. One of the output terminals of a power supply circuit 4 is connected to a first end 5 of the power wiring 1 to supply a constant voltage $V_{dd}$ to each circuit of the LSI through the power wiring 1. The ground power wiring 2 is connected to the ground terminals of each LSI circuit 3. The other end 6 of the wiring 2 is also connected to ground.

In the prior art power circuit mentioned above, current $I_{dd}$ flows on the power wiring 1 from the end 5, which is at the side of the power supply circuit 4, towards the other end. The direction of the current flow is, thus, fixed. On the other hand, current $I_{ss}$ on the ground wiring 2 flows in the reverse direction to the current $I_{dd}$. This direction of the current $I_{ss}$ is also fixed. As a result, these wirings are affected greatly by the electro-migration phenomena discussed above.

Considering the signal wirings of LSI, a signal current to charge and diacharge capacities, which are to be circuit loads, flows alternately due to the voltage change between '0' and '1'. The signal wirings can, therefore, stand strongly against the electro-migration phenomena. A constant voltage is applied to the power wirings of LSIs as mentioned above, and these wirings are affected strongly by the electro-migration phenomena.

To protect the LSI's power circuits from the electro-migration phenomena, the following three methods will be considered.
(1) To make power wiring layers thick.
(2) To make power wirings wide.
(3) To change the materials in power wirings.

These methods are, however, inconsistent with the basic idea for LSIs, that is, to make LSI wirings narrower and more fine.

Thus, in the prior art LSI power circuits, there has arisen a limit as to how fine LSI wirings can be made due to the electron-migration phenomena. This fact, then, prevents LSIs from being finer and more integrated.

SUMMARY OF THE INVENTION

This invention has been made to overcome the above mentioned disadvantages in the prior art LSI power circuits.

One object of this invention is, therefore, to provide an LSI power circuit, in which the wiring degradation caused by the electro-migration phenomena can be prevented effectively.

Another object of this invention is to provide an LSI power circuit, in which the wirings can be made finer to accelerate the integration of an LSI.

In the first aspect of this invention, there is provided an LSI power circuit in which first and second power supply circuits are provided to the ends of a power wiring. In this LSI power circuit, many circuits composing an LSI are connected to the said power wiring in order to obtain a drive voltage. Said first and second power supply circuits should be activated alternately allowing for some time-overlap.

In the second aspect of this invention, there is provided an LSI power circuit, in which both ends of a power wiring are connected to a power supply circuit through first and second switch means. These switch means are activated alternately allowing for some time-overlap. In this circuit, many circuits are connected between the both ends of said power wiring.

According to the said first and second aspects of the present invention, the current flowing between both ends of the power wiring, has its direction alternated periodically. As a result, the degradation of wirings caused by the electro-migration phenomena can be prevented to greatly improve the strength of the wiring greatly wiring. This fact also means that the wiring itself can be made finer if the life-time condition is kept the same as to that of the prior art wirings. Due to this fact, the integration of LSIs can be improved greatly.

These and other objects, features and advantages of the present invention will be more apparent from the following description of preferred embodiments, taken in conjunction with the accompanying drawings.

BRIEF DESCRIPTION OF THE DRAWINGS

FIG. 2 (b) is a timing chart of signals provided to power supply circuits shown in FIG. 2 (a).

FIG. 2 (c) shows waveforms of the current flowing on the power wirings shown in FIG. 2 (a).

FIG. 4 (b) is a timing chart of signals to control switch means shown in FIG. 4 (a).

DETAILED DESCRIPTION OF THE PRESENT INVENTION

Figure 1:
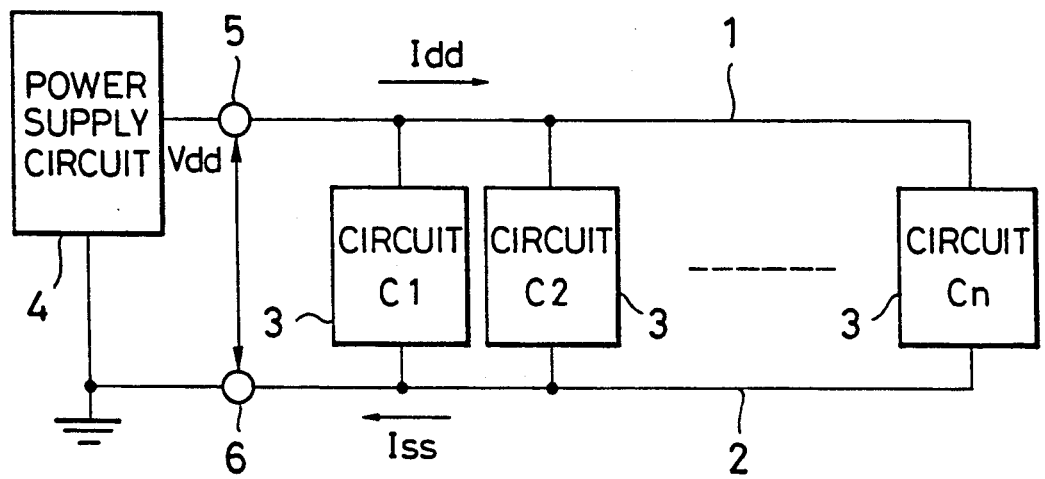
FIG. 1 shows a power circuit of an LSI according to a prior art of this invention.
Figure 2A:
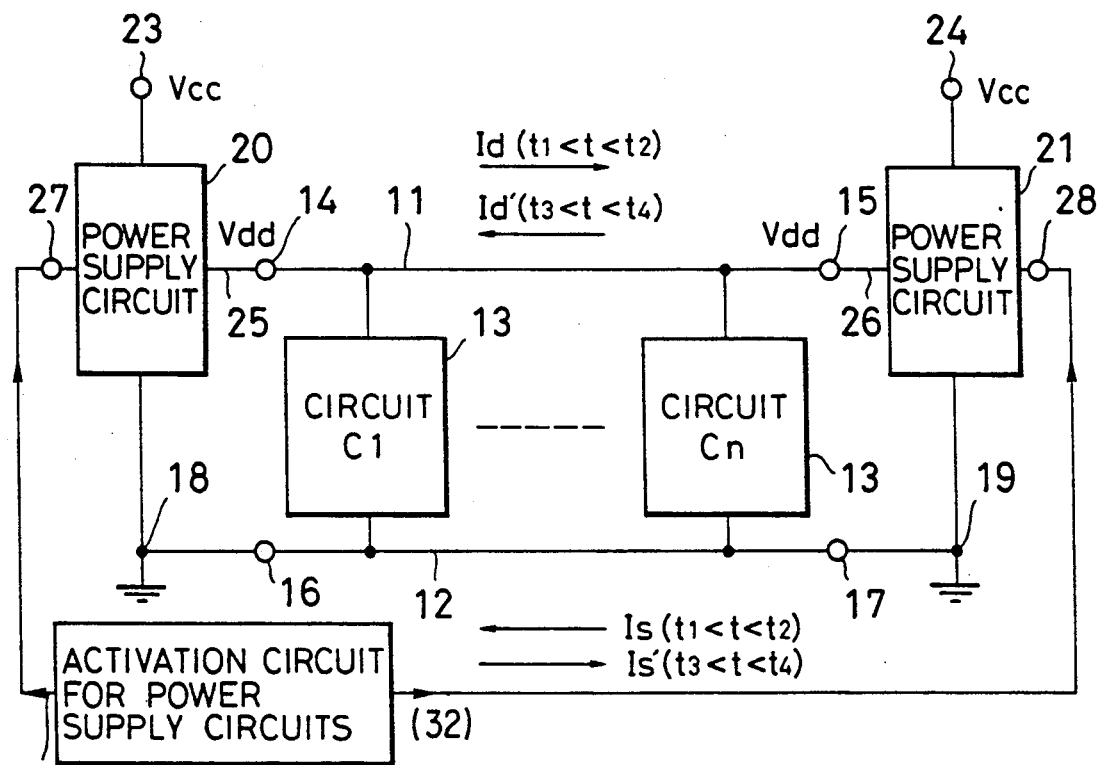
FIG. 2 (a) shows a power circuit of an LSI according to the first embodiment of this invention.
Figure 2B:
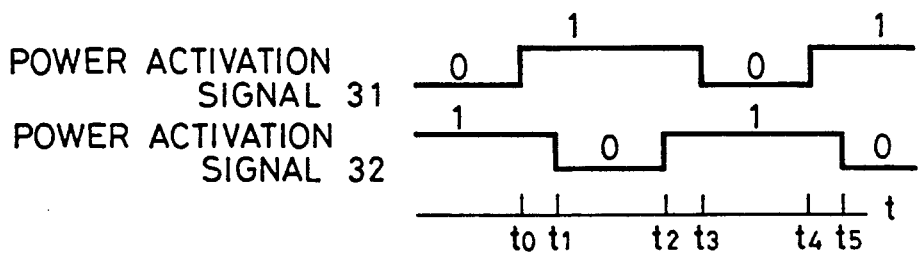
Figure 2C:
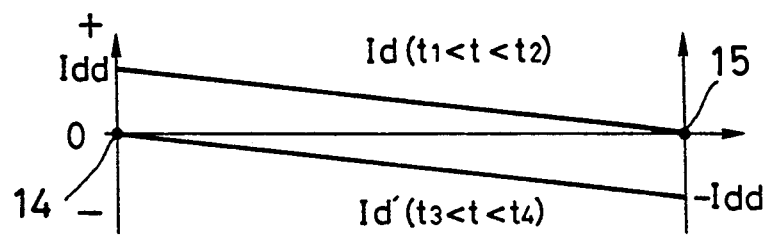

In FIG. 2 (a), a power circuit according to the first embodiment of the present invention is shown. In order to illustrate the operation of the circuit shown in FIG. 2 (a), a timing chart and a wave-form chart are shown in FIG. 2 (b) and (c).

In FIG. 2 (a), a power wiring 11 and a ground power wiring 12 are shown. Between the power wiring 11 and the ground wiring 12, n circuits $C_1 \ldots C_n$ (generally denoted 13), which compose an LSI, are connected. The power wiring 11 has a first end (terminal) 14 and a second end (terminal) 15. The ground wiring 12 also has a first end (terminal) 16 and a second end (terminal) 17. Both ends 16 and 17 of the ground wiring 12 are connected to ground through a wiring 18 or a wiring 19.

Besides the power wiring 11 and the ground wiring 12, the power circuit of this embodiment is also comprised of first and second power supply circuits 20 and 21, and an activation circuit 22 for these power supply circuits. The first and the second power supply circuits 20 and 21 are connected to ground through the wirings 18 and 19. A supply voltage $V_{cc}(-5 V)$ is applied to the power supply circuits 20 and 21 through external power supply terminals 23 and 24. These circuits 20 and 21 also receive signals in an activation level ('1' in this embodiment) from the activation circuit 22, and then, supply a fixed internal supply voltage $V_{dd}(3.0 V)$ to their power output terminals 25 and 26 in order to activate the circuits 13 of the LSI. When the activation signal is in a non-activation level (for example, '0' in this embodiment), the circuits 20 and 21 cease to supply the internal supply voltage $V_{dd}$.

As shown in FIG. 2 (b), the activation circuit 22 for the power supply circuits generates power activation signals 31 and 32. These signals 31 and 32 activate the power supply circuits 20 and 21 alternately allowing for some time-overlap. The signal 31 from the activation circuit 22 is output to a signal input terminal 27 of the first power supply circuit 20, and the signal 32 from the activation circuit 22 is output to a signal input terminal 28 of the second power supply circuit 21, respectively. The power output terminal 25 of the first power supply circuit 20 is connected to the first end 14 of the power wiring 11, and the power output terminal 26 of the second power supply circuit 21 is connected to the second end 15 of the power wiring 11.

The operation of the power circuit shown in FIG. 2 (a) will be explained below.

The activation circuit 22 for the power supply circuits generates power activation signals 31 and 32 periodically in the timming as shown in FIG. 2 (b). In periods $(t_o<t<t_1)$, $(t_2<t<t_3)$, and $(t_4<t<t_5)$, both signals are in the activation level '1', and both of the first and second power supply circuits are in a power supply state. The voltage $V_{dd}$ is, therefore, supplied to the power wiring 11 through the ends 14 and 15. On the other hand, the signal 31 is in the activation level '1' while the signal 32 is in the non-activation level '0' during the period $(t_1<t<t_2)$. Thus, the first power supply circuit 20 is in the power supply state while the second power supply circuit 21 is in the power non-supply state during this period. As a result, a current $I_d$ flows from the first end 14 to the second end 15 on the power wiring 11. At the same time, a current $I_s$ on the earth wiring 12 flows from the second end 17 to the first end 16.

On the other hand, the signal 31 is in the non-activation level '0' while the signal 32 is in the activation level '1' during the time period $(t_3<t<t_4)$. The first power supply circuit 20 is, therefore, in the power non-supply state while the second power supply circuit 21 is in the power supply state. Then, current $I_d'$ flows from the second end 15 to the first end 14 on the power wiring 11. Also, current $I_s'$ flows from the first end 16 to the second end 17 on the earth wiring 12. As a result, the current flow in the central part of the wiring 11 and 12 is alternated at the $(t_1<t<t_2)$ and $(t_3<t<t_4)$ time period.

FIG. 2 (c) shows the current $I_d$ on the power wiring 11 at the time period $(t_1<t<t_2)$ and the current $I_d'$ at the time period $(t_3<t<t_4)$ as functions of positions on the wiring. In the figure, $I_{dd}$ means the maximum current value which flows on the LSI. Also, the number n, which means the number of circuits connected to the power wiring 11, is assumed to be large enough so that these circuits consume current constantly.

Referring to FIG. 2 (c), it is apparent that the directions of current flow in the central part of the wiring is alternated for each other time period. Due to this fact, the direction of electron flow in the power wiring is also alternated for each other time period to prevent deterioration or breaking of wirings caused by the electro-migration phenomena. It can also be seen from the figure that in portions of wirings near the both ends a large current flows in one direction at either of the time periods $(t_1<t<t_2)$ or $(t_3<t<t_4)$. At the same time, a very small current flows in the reverse direction at other time period. Consequently, the current flowing near end portions of the wirings becomes a pulse-like current, and then, the deterioration of the wiring caused by the electro-migration phenomena will be prevented. Furthermore, the supplied voltage at any time during the time period $t_0 \sim t_5$, is kept at the constant value $V_{dd}$. As a result, the directions of a current flowing on the wirings may be changed alternately while keeping the voltage constant, according to the power circuit of this embodiment.

The activation circuit 22 for the power supply circuit can generate the power activation signals by synchronizing external clockings. The activation circuit 22 can also generate the power activation signals by synchronizing clock signals, which are produced by a generation circuit installed in the circuit 22.

Figure 3:
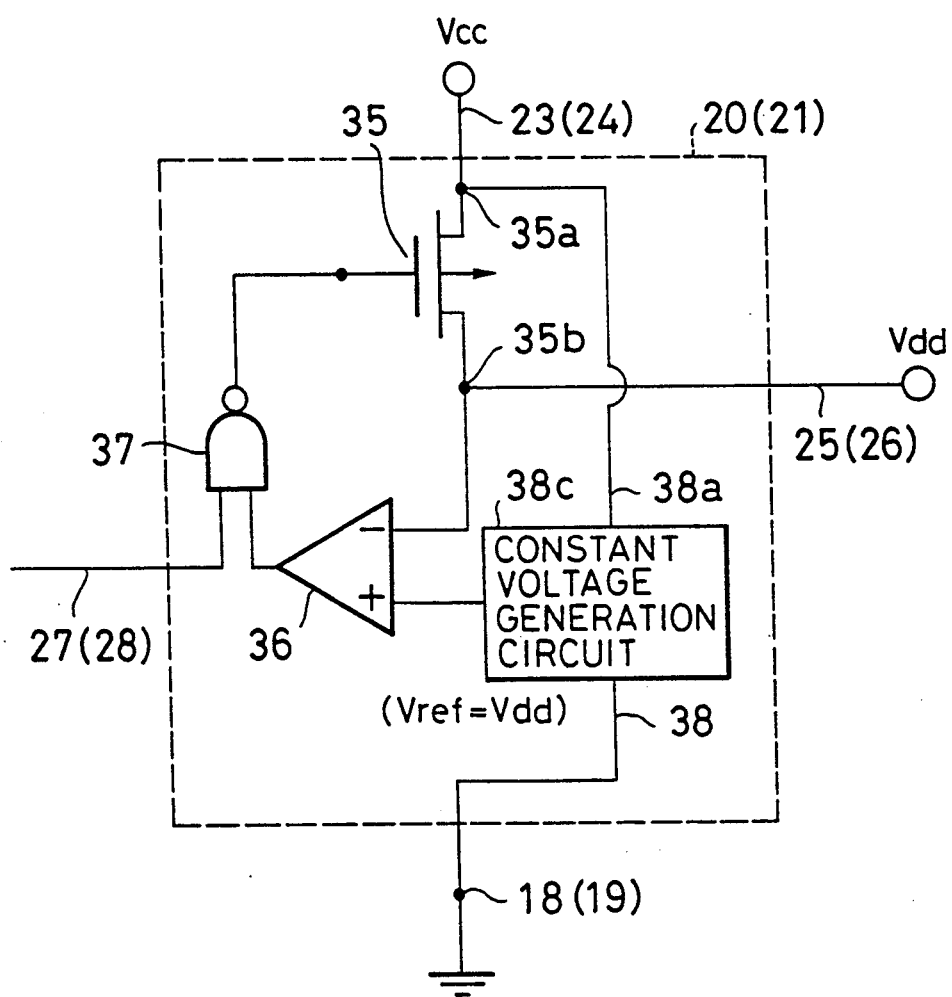
FIG. 3 shows a circuit embodying the power supply circuit shown in FIG. 2 (a).

In FIG. 3, an example of the power supply circuit 20 (21), used in the embodiment shown in FIG. 2, is shown. This circuit 20 is comprised of a power step-down means 35, which is made of a P channel MOS transistor, a differential amplifier 36, a NAND circuit 37, and a constant voltage generation circuit 38. A source terminal 35a of the P channel transistor, of which the power step-down means 35 is composed, is connected to an external power terminal 23 (24) of a power voltage $V_{cc}$ (−5 V). A drain terminal 35b is connected to a power output terminal 25 (26), from which an internal power voltage $V_{dd}(-3.0 V)$ is supplied. A power terminal 38a of a constant voltage generation circuit 38 is connected to the external power terminal 23 (24), and its ground terminal 38b is connected to the earth terminal 18 (19), in order to obtain a supply power and to output the constant voltage $V_{dd}$ at an output terminal 38c.

A negative input terminal (−) of the differential amplifier 36 is connected to the drain terminal of the P channel transistor 35, and a positive input terminal (+) of the differential amplifier 36 is connected to the output terminal 38c of the constant voltage generation circuit 38. The reference voltage $V_{ref}$ of the differential amplifier 36 is, then, set up to the output voltage $V_{dd}$ from the constant voltage generation circuit 38. On the other hand, the output terminal of the differential amplifier 36 and the input terminal 27 (28) for the power activation signals, are introduced into two input terminals of the NAND circuit 37. An output of the NAND circuit 37 is connected to the gate terminal of the P channel transistor 35, of which the power step-down means is composed.

As the power supply circuit 20 (21) is arranged as mentioned above, the P channel transistor comes off if the power activation signal, input to the terminal 27 (28), is in a non-active state, that is "0", and then, a high level signal is introduced into the base of the P channel transistor. As a result, this transistor could not supply the power voltage to the output terminal 25 (26). When the power activation signal is in an active state, that is "1", the constant voltage $V_{dd}$ is supplied to the terminal 25 (26) due to the operation of the differential amplifier 36. The power supply circuit 20 (21) is controlled as mentioned above, and forms a power supply state and a power non-supply state on its power output terminal.

The second embodiment of this invention shown in FIG. 4, will be explained below.

Figure 4A:
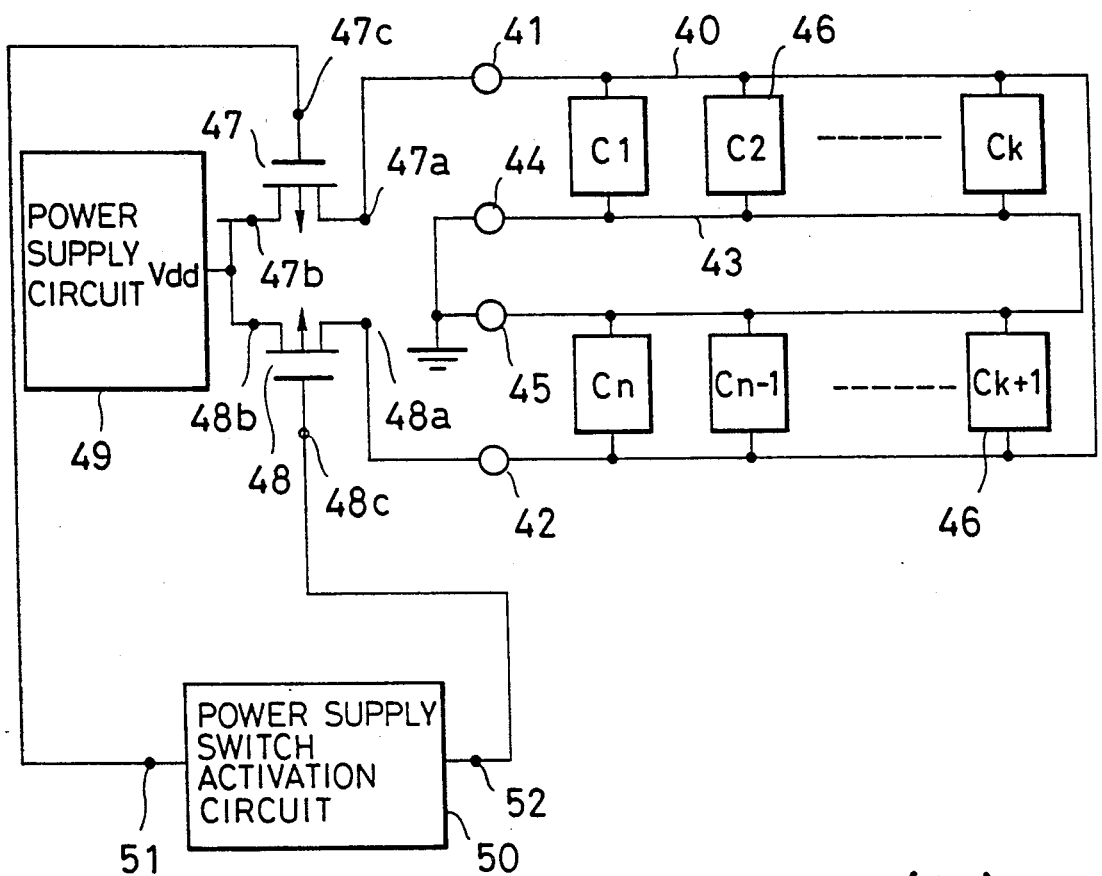
FIG. 4 (a) shows a power circuit of an LSI according to the second embodiment of this invention.
Figure 4B:
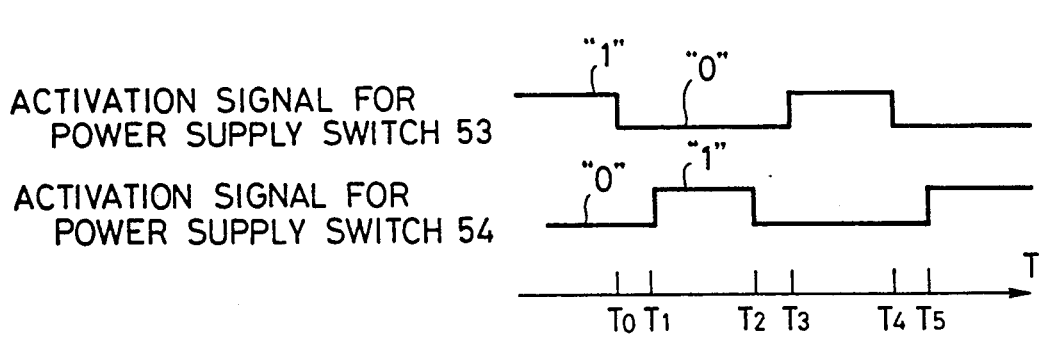

In the circuit shown in FIG. 4 (a), number 40 means a power wiring having a first end 41 and a second end 42, and number 43 means a ground power wiring having a first end 44 and a second end 45. In this embodiment, n circuits 46 ($C_1, C_2, \ldots, C_k, C_{k+1}, \ldots, C_{n-1}, C_n$) are connected between the power wiring 40 and the ground power wiring 43.

As shown in the figure, the pair of power wirings 40 and 43 are bent double at a point between the circuits $C_k$ and $C_{k+1}$. The bent figure and the bent position shown in the figure should, however, be thought of as an example and never as the only possibility. Many variations can, indeed, be created for them.

As shown in the figure, the ground power wiring 43 is earthed at both ends 44 and 45 respectively. Both ends 41 and 42 of the power wiring 40 are respectively connected to the drain terminals 47a and 48a of the P channel transistors 47 and 48, of which power supply switches are composed. On the other hand, the source terminals 47b and 48b of the P channel transistors, of which the power supply switches 47 and 48 are composed, are connected in common to a power output terminal of a power supply circuit 49, from which a constant voltage $V_{dd}$ is supplied. The gate terminals 47c and 48c of the first and second power supply transistors 47 and 48 are connected respectively to two output terminals 51 and 52 of a power supply switch activation circuit 50, as shown in the figure.

The operation of the power circuit shown in FIG. 3 (a) will be explained below.

The power supply switch activation circuit 50 generates activation signals 53 and 54 for the power supply switches periodically at their output terminals 51 and 52. The generation timings of these signals are shown in FIG. 3 (b). In this figure, both signals are kept in the low level, that is "0", during the time periods ($T_0 < T < T_1$), ($T_2 < T < T_3$), and ($T_4 < T < T_5$). These low level signals are introduced into the source terminals of the power supply switches 47 and 48 during these time periods. Thus, both switches 47 and 48 become conductive between their sources and drains. The constant voltage $V_{dd}$ is then supplied between both ends 41 and 42 of the power wiring 40 from the power supply circuit 49.

On the other hand, the switch activation signal 53 is kept in the low level, that is "0", during the time period ($T_1 < T < T_2$) while the switch activation signal 54 is kept in the high level "1". Then, the first power supply switch 47 becomes conductive while the second power supply switch 48 becomes non-conductive. As a result, the current on the power wiring 40 flows from the first end 41 to the second end 42. At the time period ($T_3 < T < T_4$), the signal 53 is kept in the high level while the signal 54 is kept in the low level. The first power supply switch 47 becomes, therefore, non-conductive and the second power supply switch 48 becomes conductive. As a result, the current on the power wiring 40 flows from the second end 42 to the first end 41. Considering about the current flow on the power wiring 40, then, the directions of the current flow are alternated for each other period, that is ($T_1 < T < T_2$) and ($T_3 < T < T_4$). Consequently, the electron flow in the wiring is alternated periodically in the central part of the wiring. The deterioration or the breaking of wirings due to the electro-migration phenomena can, therefore, be prevented in the central part of the wirings.

Considering the near end portions of the wirings, the deterioration or the breaking of wirings due to the electro-migration phenomena is also prevented by the same reason mentioned in the first embodiment. The voltage supplied to the wirings is kept at $V_{dd}$ constantly in any time during $T_0$ to $T_5$. According to the power circuit of this embodiment, the direction of the current flowing on the wirings can be alternated periodically while keeping the power voltage constant, as mentioned above. If the period for one flowing direction is set the same as that for the other flowing direction, that is, the duty ratio of the current flow cycle is set to be 50%, the life time of the central part of wiring can be improved to the magnitude of $10^2$ (100 times).

In the near end portions of wirings, the current flow ceases periodically as if it is a pulse-like current having a 50% duty ratio. The generation of Joule heat, therefore, ceases periodically.

Furthermore, the generation of Joule heat itself can be reduced greatly and the heat transmission can also be improved greatly by making the power wiring thick in its near end portion. As a result, the deterioration of the wiring due to the electro-migration phenomena can also be decreased around that portion of the wiring.

This invention should not be limited to the embodiments mentioned above. It is apparent that similar advantages will be obtained by replacing the power supply circuits 20 and 21 in the embodiment shown in FIG. 2, with the combination of the power supply circuit 49 and switches 47 and 48 shown in FIG. 4.

In summary, the deterioration of power wirings, which include ground wirings, due to the electro-migration phenomena can be decreased greatly by the power supply circuit according to this invention. The life-time of the wirings can, therefore, be improved greatly. For example, the life-time of the wirings can be extended into the order of several times to several hundred times, depending on the arrangement structure of the wirings. Therefore, the wiring itself can be made finer than that of previous wirings if the life-time condition stays the same.

As mentioned above, it can be said that this invention improves the reliability of LSI from the view point of preventing the breaking of wirings, and contributes greatly to making LSI finer and more integrated.

What is claimed is:

1. A power circuit for an LSI to supply a drive voltage to a plurality of circuits of which said LSI is composed, comprising:

a first power wiring having first and second ends used to supply a first voltage to said plurality of circuits;

a second power wiring to supply a second voltage to said plurality of circuits;

power supply circuit means to supply said first voltage to said first power wiring; and means for periodically alternating the direction of current flowing between both ends of said first wiring by receiving said first voltage from said power supply circuit means.

2. The power circuit for an LSI as claimed in claim 1, wherein said power supply circuit means is comprised of a first power supply circuit connected to said first end of the first wiring and a second power supply circuit connected to said second end of the first wiring.

3. The power circuit for an LSI as claimed in claim 2, wherein said means for periodically alternating the direction of current is a means to drive said first and second power supply circuits alternately allowing for some time-overlap.

4. The power circuit for an LSI as claimed in claim 1, wherein said second wiring is connected to ground through both ends thereof and wherein said first voltage supplied from said power supply circuit means is a drive voltage for said plurality of circuits.

5. A power circuit for an LSI to supply a drive voltage to a plurality of circuits of which said LSI is composed, comprising;

a power wiring having a first end and a second end used to supply a first voltage to said plurality of circuits.

a ground wiring used to ground said plurality of circuits;

a first power supply circuit connected to said first end of said power wiring;

a second power supply circuit connected to said second end of said power wiring; and an activation circuit connected to said first and second power supply circuits for alternately activating said first and second power supply circuits allowing for some time-overlap.

6. The power circuit for an LSI as claimed in claim 5, wherein said activation circuit for said first and second power supply circuits generates activation signals having an activation level and a non-activation level, and wherein said first and second power supply circuits apply a constant voltage to said power wirings by receiving signals in the activation level and cease to apply the constant voltage by receiving signals in the non-activation level.

7. A power circuit for an LSI to supply a drive voltage to a plurality of circuits of which said LSI is composed, comprising:

a power wiring having first and second ends used to supply a first voltage to said plurality of circuits connected between both ends;

a ground wiring to ground said plurality of circuits;

first switch means connected to said first end of said power wiring;

second switch means connected to said second end of said power wiring;

a power supply circuit connected to said first and second ends of said power wiring through said first and second switch means; and an activation circuit used to switch alternately said first and second switching means allowing for some time-overlap.

8. The power circuit for an LSI as claimed in claim 7, wherein said first and second switch means are P channel transistors connected their gates to said activation circuit.

9. The power circuit for an LSI as claimed in claim 7, wherein said power wiring is bent double in the near central part of said wiring and wherein each end of said wiring is connected to said power supply circuit through said first and second switch means, respectively.

10. The power circuit for an LSI as claimed in claim 7, wherein said ground wiring is bent double in the near central part of said wiring and each end of the wiring is connected to the ground in common.

* * * * *